United States Patent
Ogawa et al.

(10) Patent No.: US 11,171,349 B2
(45) Date of Patent: Nov. 9, 2021

(54) FUEL CELL VEHICLE AND CONTROL METHOD OF FUEL CELL VEHICLE

(71) Applicant: TOYOTA JIDOSHA KABUSHIKI KAISHA, Toyota (JP)

(72) Inventors: Tomohiro Ogawa, Miyoshi (JP); Tomotaka Ishikawa, Nagoya (JP); Shinji Asou, Toyota (JP); Tomio Yamanaka, Nagoya (JP); Junichi Matsuo, Okazaki (JP); Ryosuke Oya, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 237 days.

(21) Appl. No.: 16/438,620

(22) Filed: Jun. 12, 2019

(65) Prior Publication Data

US 2020/0036023 A1    Jan. 30, 2020

(30) Foreign Application Priority Data

Jul. 25, 2018   (JP) .............................. JP2018-139270

(51) Int. Cl.
| | |
|---|---|
| *H01M 8/04029* | (2016.01) |
| *H01M 8/04082* | (2016.01) |
| *H01M 8/04225* | (2016.01) |
| *H01M 8/04302* | (2016.01) |
| *H01M 8/0432* | (2016.01) |
| *H01M 8/04701* | (2016.01) |
| *B60L 58/33* | (2019.01) |
| *B60L 58/34* | (2019.01) |

(52) U.S. Cl.
CPC ......... *H01M 8/04701* (2013.01); *B60L 58/33* (2019.02); *B60L 58/34* (2019.02); *H01M 8/04029* (2013.01); *H01M 8/0432* (2013.01); *H01M 8/04082* (2013.01); *H01M 8/04225* (2016.02); *H01M 8/04302* (2016.02); *H01M 2250/20* (2013.01)

(58) Field of Classification Search
CPC ......... H01M 8/04701; H01M 8/04225; H01M 8/04302; H01M 8/0432; H01M 8/04029; H01M 8/04082; H01M 2250/20; H01M 16/006; H01M 8/04253; H01M 8/04619; H01M 8/04955; H01M 8/04552; H01M 8/04738; H01M 8/0488; H01M 8/0491; H01M 8/04753; B60L 58/33; B60L 58/34; B60L 50/75; B60L 58/40; Y02E 60/10; Y02E 60/50; Y02T 90/14; Y02T 10/7072; Y02T 10/70; Y02T 90/40
See application file for complete search history.

(56) References Cited

U.S. PATENT DOCUMENTS

| | | | | |
|---|---|---|---|---|
| 2015/0328991 | A1* | 11/2015 | Roh | H01M 10/625 701/22 |
| 2017/0040609 | A1* | 2/2017 | Takahata | H01M 4/587 |
| 2017/0162924 | A1* | 6/2017 | Yoon | B60L 58/13 |
| 2017/0237092 | A1* | 8/2017 | Ogawa | H01M 10/486 429/9 |
| 2018/0358636 | A1* | 12/2018 | Sato | H01M 8/04559 |

FOREIGN PATENT DOCUMENTS

| | | |
|---|---|---|
| JP | 2008-177116 A | 7/2008 |
| JP | 2018-073565 A | 5/2018 |

* cited by examiner

*Primary Examiner* — Muhammad S Siddiquee
(74) *Attorney, Agent, or Firm* — Dickinson Wright, PLLC (57) ABSTRACT

A fuel cell vehicle comprises a fuel cell, a power storage device, a drive motor, a temperature sensor configured to measure a temperature of the fuel cell, a detector configured to detect an operation condition of the fuel cell, and a controller. At a start time of the fuel cell, in a case where the temperature of the fuel cell detected by the temperature sensor is below a freezing point, when an output condition of the fuel cell shown by the detected operation condition of the fuel cell continuously corresponds to a predetermined low output condition for a predetermined reference time period or longer, the controller sets a driving state of the fuel cell vehicle to a first driving state that stops power generation of the fuel cell, drives the drive motor by using only the power storage device as a power source and limits a motor output of the drive motor to be equal to or lower than a predetermined first upper limit output.

6 Claims, 7 Drawing Sheets

FUEL CELL VEHICLE AND CONTROL METHOD OF FUEL CELL VEHICLE

CROSS REFERENCE TO RELATED APPLICATIONS

The present application claims priority from Japanese patent application 2018-139270 filed on Jul. 25, 2018, the entirety of the content of which is hereby incorporated by reference into this application.

BACKGROUND

Field

The present disclosure relates to a fuel cell vehicle and a control method of the fuel cell vehicle.

Related Art

A fuel cell vehicle is expected to be started under various temperature conditions. Water is generally generated in a fuel cell during power generation of the fuel cell, and liquid water is likely to be accumulated in a reactive gas flow path provided in the fuel cell. At a start of the fuel cell vehicle under a sub-zero temperature condition, when the liquid water accumulate in the fuel cell is frozen, this results in an insufficient flow of a reactive gas in the fuel cell and is likely to cause a trouble during power generation of the fuel cell. A proposed measure at a start of the fuel cell vehicle under a low temperature condition warms up the fuel cell by a low efficiency operation that has a lower power generation efficiency of the fuel cell than an ordinary operation (as described in, for example, Patent Literature 1).

Patent Literature 1: JP 2018-073565A

The warm-up of the fuel cell by the low efficiency operation as described above is, however, more likely to limit the output power of the fuel cell and cause the state of insufficient output of the fuel cell. Continuation of the state of insufficient output of the fuel cell at the start of the fuel cell vehicle is likely to cause a secondary battery mounted on the fuel cell vehicle to output a larger amount of electric power and to be thereby over-discharged. There is a possibility of requiring an abrupt stop of the fuel cell vehicle.

SUMMARY

According to one aspect of the present disclosure, there is provided a fuel cell vehicle. This fuel cell vehicle comprises a fuel cell; a power storage device configured to be charged; a drive motor configured to receive electric power supplied from at least one of the fuel cell and the power storage device and to drive the fuel cell vehicle; a temperature sensor configured to measure a temperature of the fuel cell; a detector configured to detect an operation condition of the fuel cell; and a controller configured to control a driving state of the fuel cell vehicle. At a start time of the fuel cell, in a case where the temperature of the fuel cell detected by the temperature sensor is below a freezing point, when an output condition of the fuel cell shown by the detected operation condition of the fuel cell continuously corresponds to a predetermined low output condition for a predetermined reference time period or longer, the controller sets the driving state of the fuel cell vehicle to a first driving state that stops power generation of the fuel cell, drives the drive motor by using only the power storage device as a power source and limits a motor output of the drive motor to be equal to or lower than a predetermined first upper limit output.

DETAILED DESCRIPTION

A. First Embodiment (A-1) General Configuration of Fuel Cell Vehicle

Figure 1:
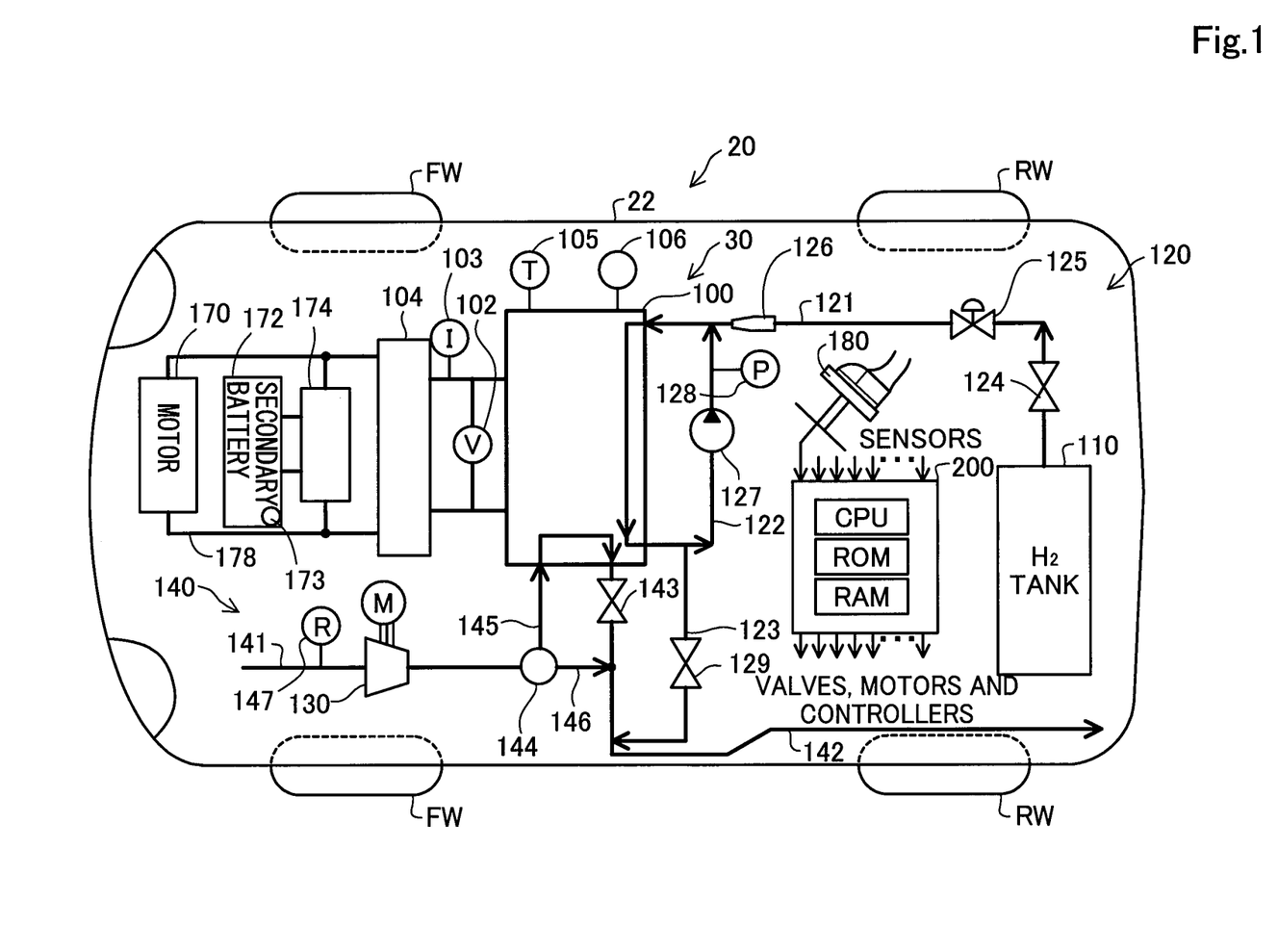
FIG. 1 is a block diagram illustrating the schematic configuration of a fuel cell vehicle.

FIG. 1 is a block diagram illustrating the schematic configuration of a fuel cell vehicle 20 according to a first embodiment of the present disclosure. In the fuel cell vehicle 20, a drive motor 170 configured to generate a driving force of the vehicle, a fuel cell system 30 including a fuel cell 100, a secondary battery 172 configured to supply electric power for driving the fuel cell vehicle 20, and a controller 200 are mounted on a vehicle body 22. The fuel cell vehicle 20 is configured to supply electric power to a load including the drive motor 170 from either the fuel cell 100 or the secondary battery 172 alone or from both the fuel cell 100 and the secondary battery 172 simultaneously. The fuel cell 100 is connected with the load including the drive motor 170 by a DC-DC converter 104 and a wiring 178. The secondary battery 172 is connected with the load including the drive motor 170 by a DC-DC converter 174 and the wiring 178. The DC-DC converter 104 and the DC-DC converter 174 are connected in parallel to the wiring 178.

The fuel cell system 30 includes a hydrogen gas supply portion 120 including a hydrogen tank 110 and an air supply portion 140 including a compressor 130, in addition to the fuel cell 100. The fuel cell system 30 further includes a cooling medium circulating portion (not shown) configured to circulate a cooling medium in the fuel cell 100 for the purpose of keeping the temperature of the fuel cell 100 in a predetermined range.

The fuel cell 100 has a stack structure formed by stacking a plurality of unit cells. The fuel cell 100 is a polymer electrolyte fuel cell according to the embodiment but may be another type of fuel cell. In each of the unit cells constituting the fuel cell 100, a flow path which hydrogen serving as a fuel gas flows in (hereinafter may be referred to as anode-side flow path) and a flow path which the air serving as an oxidizing gas flows in (hereinafter may be referred to as cathode-side flow path) are formed respectively on an anode side and a cathode side across an electrolyte membrane. The wiring 178 arranged to connect the fuel cell 100 with the DC-DC converter 104 is provided with a voltage sensor 102 configured to detect an output voltage of the fuel cell 100 and a current sensor 103 configured to detect an output current of the fuel cell 100.

The fuel cell 100 is provided with a temperature sensor 105 configured to measure the temperature of the fuel cell 100. For example, the temperature sensor 105 may be a temperature sensor provided in a flow path of the cooling medium described above to detect the temperature of the cooling medium that is circulated in the fuel cell 100 and is then discharged from the fuel cell 100. In another example, the temperature sensor 105 may be a sensor configured to directly detect the internal temperature of the fuel cell 100. Additionally, the fuel cell 100 is provided with a cell monitor 106. The cell monitor 106 is a device configured to detect the power generation condition of the fuel cell 100 or more specifically to detect an output voltage of each of the unit cells constituting the fuel cell 100. According to the embodiment, the cell monitor 106 is used to detect whether there is any unit cell having a negative voltage (hereinafter may be referred to as negative voltage cell) as described later. The cell monitor 106 may have any configuration to detect the presence of a negative voltage cell, for example, a configuration of detecting the output voltage for each of the unit cells or a configuration of detecting the output voltage for every two adjacent unit cells. The cell monitor 106 may be configured to detect the electric current, the impedance, the temperature or the like, in addition to the output voltage of the unit cell. Detection signals of the voltage sensor 102, the current sensor 103, the temperature sensor 105 and the cell monitor 106 are output to the controller 200.

The hydrogen tank 110 included in the hydrogen gas supply portion 120 may be, for example, a tank configured to store high-pressure hydrogen gas. The hydrogen gas supply portion 120 includes a hydrogen supply flow path 121 provided between the hydrogen tank 110 and the fuel cell 100, a circulation flow path 122 configured to circulate non-consumed hydrogen gas (anode off-gas) to the hydrogen supply flow path 121, and a hydrogen release flow path 123 configured to release the anode off-gas to the atmosphere. In the hydrogen gas supply portion 120, the hydrogen gas stored in the hydrogen tank 110 is subjected to regulation of an open/close timing of an on-off valve 124 provided in the hydrogen supply flow path 121 and pressure reduction by means of a pressure reducing valve 125 and is then supplied to the anode-side flow path of the fuel cell 100 by means of a hydrogen supply device 126 (for example, an injector) provided on the downstream side of the pressure reducing valve 125. The pressure of hydrogen circulated in the circulation flow path 122 is regulated by a circulation pump 127. The controller 200 refers to the pressure of the circulated hydrogen detected by a pressure sensor 128 and regulates the driving amounts of the hydrogen supply device 126 and the circulation pump 127 according to a target power that is to be output from the fuel cell 100.

An open/close timing of an on-off valve 129 provided in the hydrogen release flow path 123 that is branched off from the circulation flow path 122 is regulated such that part of the hydrogen gas flowing in the circulation flow path 122 is released to the atmosphere at a predetermined timing. This configuration causes impurities (for example, water vapor and nitrogen) other than hydrogen included in the hydrogen gas circulated in the circulation flow path 122 to be discharged out of the flow path and thereby suppresses an increase in concentration of the impurities included in the hydrogen gas that is supplied to the fuel cell 100. The open/close timing of the on-off valve 124 described above is regulated by the controller 200.

The air supply portion 140 includes a first air flow path 141, a second air flow path 145, a third air flow path 146, a flow dividing valve 144, an air release flow path 142, a back pressure valve 143 and a flow sensor 147, in addition to the compressor 130. The first air flow path 141 is a flow path which the total amount of the air taken in by the compressor 130 flows in. The second air flow path 145 and the third air flow path 146 are provided to be branched off from the first air flow path 141. The flow dividing valve 144 is provided at a location where the second air flow path 145 and the third air flow path 146 are branched off from the first air flow path 141. A division ratio of the air flowing from the first air flow path 141 to the second air flow path 145 or to the third air flow path 146 is changeable by changing the valve-open condition of this flow dividing valve 144. Part of the second air flow path 145 forms the cathode-side flow path in the fuel cell 100. The third air flow path 146 serves as a bypass flow path configured to lead the air flow without going through the fuel cell 100. The second air flow path 145 and the third air flow path 146 are joined together to the air release flow path 142. The back pressure valve 143 is a throttle valve provided in the second air flow path 145 on a downstream side of the cathode-side flow path but on an upstream side of the connecting location where the second air flow path 145 and the third air flow path 146 are joined together. The back pressure in the cathode-side flow path of the fuel cell 100 is changeable by regulating the opening position of the back pressure valve 143. The air release flow path 142 serves as a flow path configured to release the air flowing through the second air flow path 145 (cathode off-gas) along with the air flowing through the third air flow path 146, to the atmosphere. The hydrogen release flow path 123 described above is connected with the air release flow path 142. Hydrogen released via the hydrogen release flow path 123 is diluted with the air flowing in the air release flow path 142 before being released to the atmosphere. The flow sensor 147 is provided in the first air flow path 141 to detect the total flow rate of the air taken in through the first air flow path 141.

In the air supply portion 140, the flow rate of the air (flow rate of oxygen) that is supplied to the cathode-side flow path of the fuel cell 100 is regulatable by changing at least one condition selected from the driving amount of the compressor 130, the valve-open condition of the flow dividing valve 144, and the opening position of the back pressure valve 143. The driving amount of the compressor 130, the valve-open condition of the flow dividing valve 144 and the opening position of the back pressure valve 143 are regulated by the controller 200. In the air supply portion 140, for example, the first air flow path 141 may be provided with a humidifier to humidify the air that is supplied to the fuel cell 100.

The secondary battery 172 may be configured by, for example, a lithium ion battery or a nickel metal hydride battery. The secondary battery 172 may be any power storage device that is chargeable and dischargeable. Such a power storage device may be configured, for example, as a capacitor, in place of the secondary battery. The secondary battery 172 is provided with a state of charge monitor 173. The state of charge monitor 173 is configured to detect the operating condition, such as the state of charge, of the secondary battery 172. The state of charge of the secondary battery 172 is used as an index indicating the charge level of the secondary battery 172. For example, the state of charge monitor 173 may integrate a charging/discharging current value of the secondary battery 172 with respect to the time to detect the state of charge. In another example, the state of charge monitor 173 may use the voltage of the secondary battery 172 to detect the state of charge. The detected state of charge of the secondary battery 172 is output to the controller 200.

The DC-DC converter 104 serves to change the output condition of the fuel cell 100 in response to a control signal from the controller 200. More specifically, the DC-DC converter 104 extracts the electric current and the voltage from the fuel cell 100 toward the load described above and performs switching control to control the electric current and the voltage extracted from the fuel cell 100. The DC-DC converter 104 boosts the output voltage of the fuel cell 100 to a voltage level usable by the above load in the process of supplying electric power generated by the fuel cell 100 is supplied to the load such as the drive motor 170.

The DC-DC converter 174 has a charge discharge control function to control charging and discharging of the secondary battery 172 and more specifically serves to control charging and discharging of the secondary battery 172 in response to a control signal from the controller 200. Additionally, the DC-DC converter 174 sets an output-side target voltage under control of the controller 200 and performs extraction of the electric power accumulated in the secondary battery 172 and application of a voltage to the drive motor 170, so as to variably regulate the power extraction condition and the voltage level applied to the drive motor 170. When there is no need to charge or discharge the secondary battery 172, the DC-DC converter 174 disconnects the secondary battery 172 from the wiring 178.

The controller 200 is configured by a microcomputer including, for example, a CPU that performs arithmetic operations, a ROM and a RAM. The controller 200 obtains detection signals from various sensors, for example, an accelerator position sensor 180, a shift position sensor, a vehicle speed sensor and an ambient temperature sensor, in addition to the sensors provided in the hydrogen gas supply portion 120 and the air supply portion 140 described above and performs various controls with regard to the fuel cell vehicle 20. For example, the controller 200 determines a required output for the drive motor 170 based on, for example, the detection signal of the accelerator position sensor 180 and outputs driving signals to the fuel cell 100 and the secondary battery 172 such as to obtain electric power corresponding to the required output from at least one of the fuel cell 100 and the secondary battery 172. More specifically, in the case where the electric power is obtained from the fuel cell 100, the amounts of the respective gases supplied from the hydrogen gas supply portion 120 and the air supply portion 140 are controlled to obtain a desired electric power from the fuel cell 100. The controller 200 also controls the DC-DC converters 104 and 174 to supply a desired electric power from at least one of the fuel cell 100 and the secondary battery 172 to the load including the drive motor 170. The controller 200 is additionally provided with a timer to measure an elapsed time since input of each of various signals or since execution of each of various processes.

(A-2) Warm-Up Operation

Figure 2:
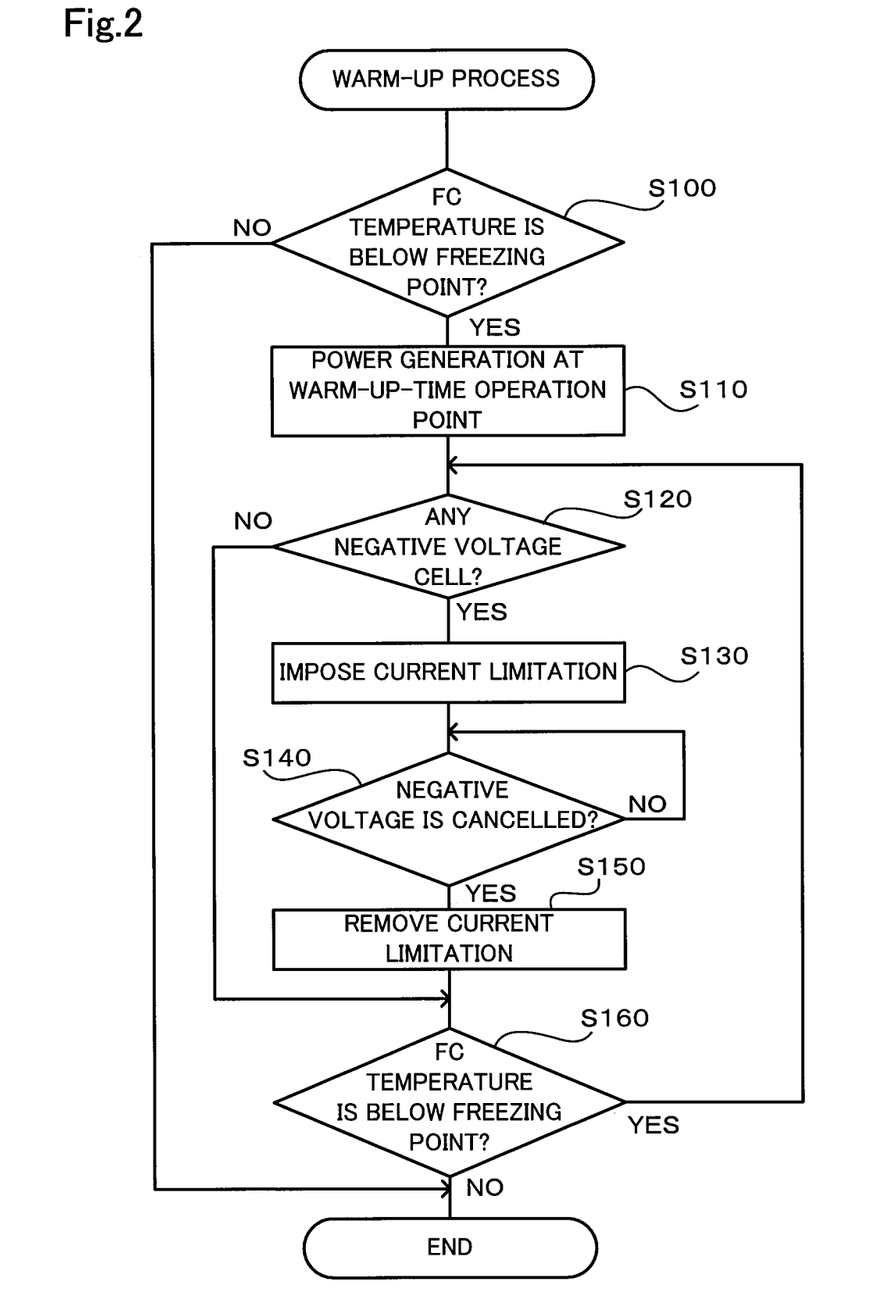
FIG. 2 is a flowchart showing a warm-up process routine.

FIG. 2 is a flowchart showing a warm-up process routine performed by the CPU of the controller 200 at a start of the fuel cell vehicle 20. The following first describes the outline of warm-up operation performed at a start of the fuel cell vehicle 20 with referring to FIG. 2. This routine is triggered, in response to input of a command for starting the fuel cell system 30 to make the fuel cell vehicle 20 drivable, for example, in response to the driver's press of a start switch (not shown) of the fuel cell vehicle 20.

When this routine is triggered, the CPU of the controller 200 obtains the temperature of the fuel cell 100 from the temperature sensor 105 and determines whether the temperature of the fuel cell 100 is below the freezing point (step S100). More specifically, it is determined at step S100 whether the temperature of the fuel cell 100 is equal to or lower than 0° C. under the environment of ordinary pressure. When the fuel cell vehicle 20 is used at a highland or the like having the lower atmospheric pressure, the reference temperature set to the freezing point at step S100 may be changed appropriately according to the atmospheric pressure in the use environment. The atmospheric pressure in the use environment may be detected directly by an atmospheric pressure sensor provided in the fuel cell vehicle 20 or may be estimated from the altitude of a location where the fuel cell vehicle 20 is located, based on location information of the fuel cell vehicle 20.

When it is determined that the temperature of the fuel cell 100 is higher than the freezing point (step S100: NO), this means that there is no need for a warm-up operation that is performed to make the temperature of the fuel cell 100 higher than the freezing point as described below. The controller 200 accordingly terminates this routine.

When it is determined that the temperature of the fuel cell 100 is below the freezing point (step S100: YES), on the other hand, the controller 200 starts the warm-up operation and causes the fuel cell 100 to generate electric power at a warm-up-time operation point.

The warm-up operation means an operation condition of actively raising the temperature of the fuel cell 100 such as to cause the temperature of the fuel cell 100 to reach a temperature range determined in advance as the steady state. At step S110, the warm-up operation is performed to increase the temperature of the fuel cell 100 to be higher than the freezing point. According to the embodiment, a target current and a target voltage of the fuel cell 100 are determined as the warm-up-time operation point set at step S110, such that the amount of electricity and the amount of heat generated by the fuel cell 100 satisfy a target amount of generated electricity and a target amount of generated heat determined in advance. The controller 200 outputs a command signal to the DC-DC converter 104 to achieve the target current and the target voltage. In the warm-up operation, a stoichiometric ratio of the oxidizing gas that is supplied to the fuel cell 100 is set to be lower than the stoichiometric ratio in the steady state, and the power generation loss of the fuel cell 100 is increased by increasing the oxygen concentration overpotential. The stoichiometric ratio of the oxidizing gas means a ratio of the amount of oxygen actually supplied to the minimum amount of oxygen required for the target amount of generated electricity described above.

The controller 200 subsequently determines whether there is any negative voltage cell in the fuel cell 100, based on the detection signal from the cell monitor 106 (step S120). When there is any negative voltage cell (step S120: YES), the controller 200 limits the output current of the fuel cell 100 (step S130). The determination of step S120 means determination of whether any of the unit cells constituting the fuel cell 100 is frozen. In the warm-up operation of the fuel cell 100 at a sub-zero start, when the fuel gas flow path in any of the unit cells is frozen, power generation reaction in the unit cell is suppressed due to the insufficiency of hydrogen. Even in this case, the power generation reaction continues in the other unit cells. The unit cell having the insufficiency of hydrogen acts as a resistance in the fuel cell 100 to generate a negative voltage. Continuation of the warm-up operation in this state is likely to cause a trouble, for example, damage of the fuel cell 100. When any negative voltage cell is detected at step S120, the controller 200 accordingly limits the output current of the fuel cell 100 to reduce the amount of generated electricity and thereby reduce the possibility of the trouble. According to the embodiment, the degree of limitation of the output current is changed according to the level of negative voltage generated. More specifically, the smaller value is set to the target current of the fuel cell 100 at step S130 at the higher level of negative voltage generated. According to a modification, the current limitation at step S130 may uniformly limit the output current, irrespective of the level of negative voltage generated.

The controller 200 subsequently obtains the detection signal from the cell monitor 106 again and determines whether the current limitation at step S130 results in cancelling the negative voltage and eliminating the negative voltage cell (step S140). When it is determined that the negative voltage is not yet cancelled (step S140: NO), the determination of step S140 is repeated until cancellation of the negative voltage. During repetition of the determination with regard to cancellation of the negative voltage at step S140, the target current set at step S130 may be maintained or may be changed appropriately.

When it is determined that the negative voltage is cancelled (step S140: YES), the controller 200 removes the current limitation and returns the limited setting of the target current of the fuel cell 100 to the target current originally set at step S110 (step S150).

The controller 200 subsequently obtains the temperature of the fuel cell 100 from the temperature sensor 105 and determines whether the temperature of the fuel cell 100 is below the freezing point (step S160). The processing of step S160 determines whether the temperature of the entire fuel cell 100 has been increased to such a level that the inside of the fuel cell 100 is not frozen and becomes higher than the freezing point. The reference temperature used at step S160 may be a temperature higher than the freezing point.

When it is determined that there is no negative voltage cell (step S120: NO), the controller 200 also proceeds to step S160 to similarly determine whether the temperature of the fuel cell 100 has been increased to the level that the inside of the fuel cell 10 is not frozen.

When it is determined that the temperature of the fuel cell 10 is below the freezing point (step S160: YES), the controller 200 returns the flow to step S120 and repeats the processing of steps S120 to S160. The water generated in the fuel cell 100 in the course of power generation is likely to be frozen in the fuel cell 100 until the temperature of the fuel cell 100 becomes higher than the freezing point. When it is determined that the temperature of the fuel cell 10 becomes higher than the freezing point (step S160: NO), the controller 200 terminates the routine.

(A-3) Control at Start Time

Figure 3:
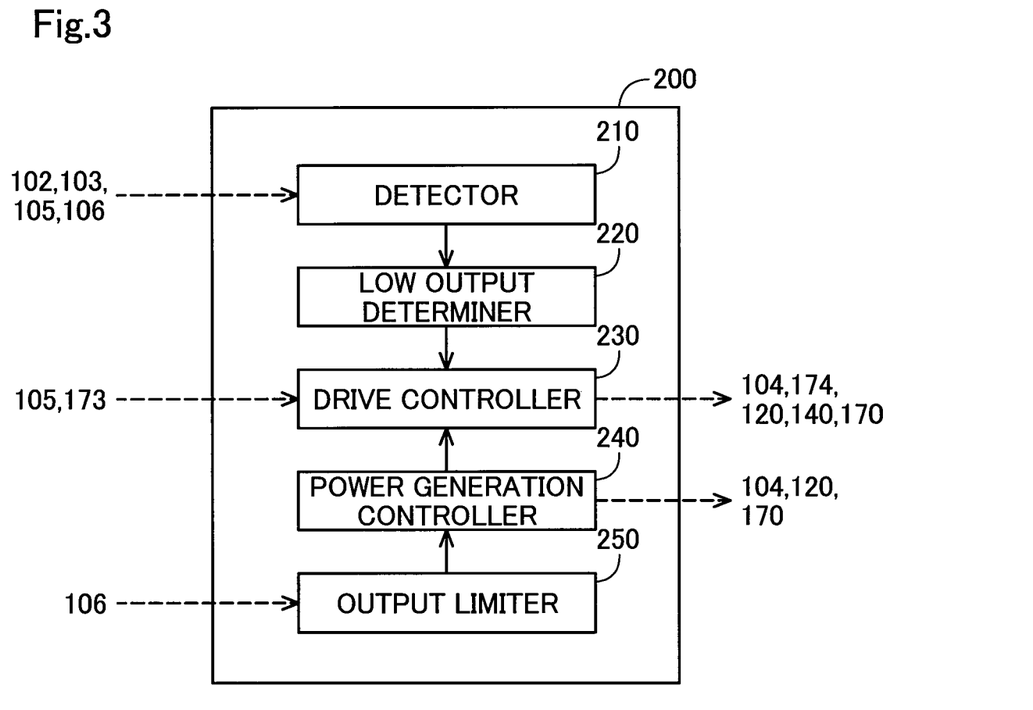
FIG. 3 is a functional block diagram illustrating some of functions of a controller.

FIG. 3 is a functional block diagram illustrating some of the functions of the controller 200. The controller 200 includes a detector 210, a low output determiner 220, a drive controller 230, a power generation controller 240 and an output limiter 250 as functional blocks. The fuel cell vehicle 20 of the embodiment performs the warm-up operation described above at a start in a low temperature condition, determines whether the output condition of the fuel cell 100 corresponds to a predetermined low output condition, and then determines whether the fuel cell vehicle 20 is subjected to an evacuation run based on the result of the above determination. The functional blocks shown in FIG. 3 are involved in this process.

Figure 4:
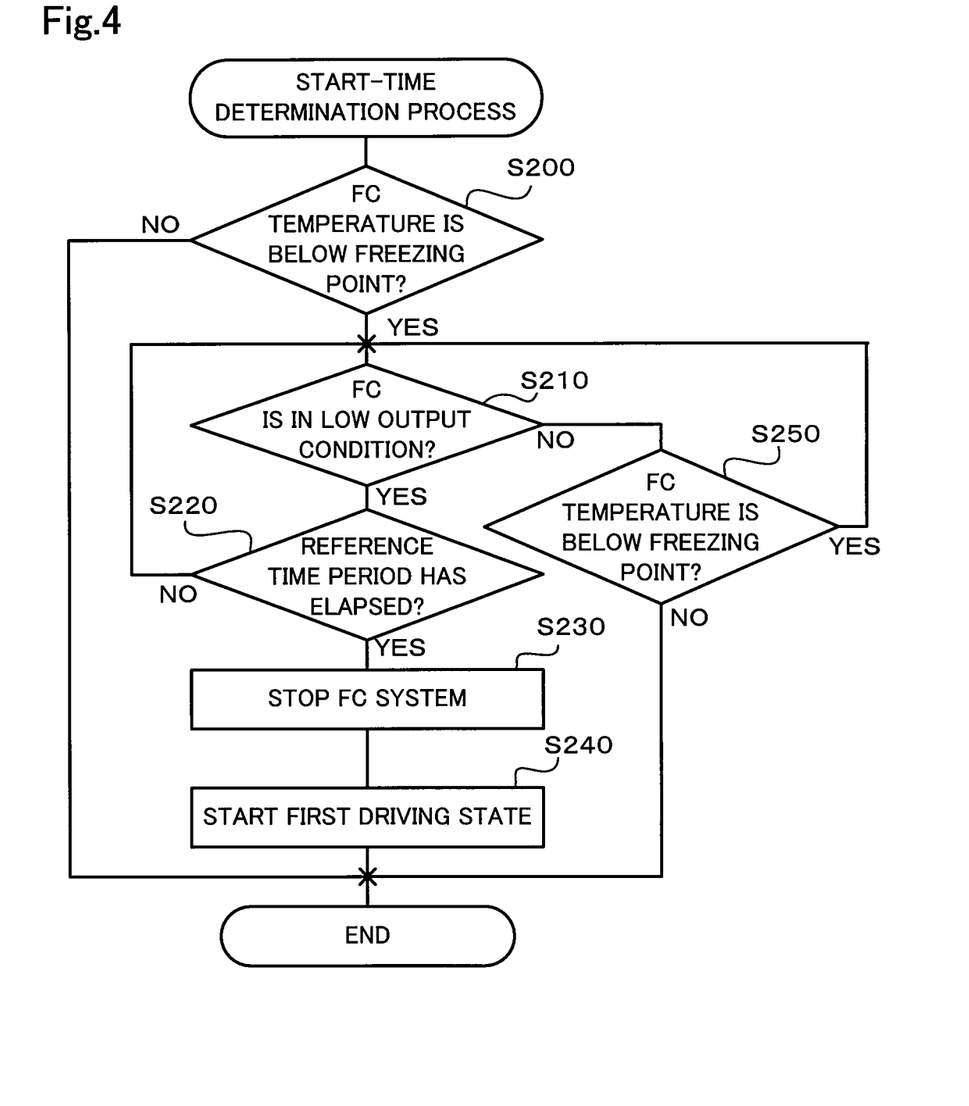
FIG. 4 is a flowchart showing a start-time determination process routine.

FIG. 4 is a flowchart showing a start-time determination process routine performed by the CPU of the controller 200 at a start of the fuel cell vehicle 20. This routine is triggered, in response to input of a command for starting the fuel cell system 30 to make the fuel cell vehicle 20 drivable, for example, in response to the driver's press of the start switch (not shown) of the fuel cell vehicle 20.

When this routine is triggered, the CPU of the controller 200 obtains the temperature of the fuel cell 100 from the temperature sensor 105 and determines whether the temperature of the fuel cell 100 is below the freezing point (step S200). The processing of step S200 is identical with the processing of step S100 described above and is thus not described in detail. The start-time determination process routine of FIG. 4 is performed in parallel to the warm-up process routine of FIG. 2 at a start of the fuel cell vehicle 20. Accordingly, when it is determined that the temperature of the fuel cell 100 is below the freezing point (step S200: YES), the warm-up operation shown in FIG. 2 is performed in the fuel cell vehicle 20.

When it is determined that the temperature of the fuel cell 100 is higher than the freezing point (step S200: NO), it is determined that the fuel cell 100 does not have a trouble due to freezing. The controller 200 accordingly terminates this routine.

When it is determined that the temperature of the fuel cell 100 is below the freezing point (step S200: YES), on the other hand, the controller 200 subsequently determines whether the output condition of the fuel cell 100 is a predetermined low output condition (step S210). More specifically, the detector 210 of the controller 200 detects an operation condition of the fuel cell 100. The low output determiner 220 subsequently uses the detected operation condition to determine whether the output condition of the fuel cell 100 is the predetermined low output condition. When it is determined at step S210 that the output condition of the fuel cell 100 is the low output condition, the inside of the fuel cell 100 is expected to be frozen.

The detector 210 of the embodiment detects an output power of the fuel cell 100 as the operation condition described above. More specifically, at step S200, the detector 210 obtains the output voltage and the output current of the fuel cell 100 from the voltage sensor 102 and the current sensor 103 and calculates the output power of the fuel cell 100. At step S210, the low output determiner 220 compares the calculated output power of the fuel cell 100 with a predetermined reference power and determines that the fuel cell 100 is in the low output condition when the output power is smaller than the reference power.

According to the embodiment, the reference power is determined as the sum of an "evacuation-time motor power consumption" (a) and an "evacuation-time auxiliary machinery power consumption" (b). The "evacuation-time motor power consumption" (a) denotes an electric power determined in advance as a maximum power consumable by the drive motor 170 when the driving state of the fuel cell vehicle 20 is a first driving state and is also called first power. The "evacuation-time auxiliary machinery power consumption" (b) denotes an electric power consumed by auxiliary machines of the fuel cell 100 when the fuel cell 100 generates electric power equivalent to the "evacuation-time motor power consumption" (a) and is also called second power. The first driving state denotes a driving state set at step S240 described later. More specifically, the first driving state denotes a driving state that the fuel cell 100 stops power generation, that the drive motor 170 is driven with only the secondary battery 172 used as the power source and that the motor output of the drive motor 170 is limited to be equal to or lower than a predetermined first upper limit output. The following describes the first driving state and power consumption in the first driving state.

In the first driving state, for example, speed limitation such as a maximum speed of 20 km/h may be imposed, and a maximum output of the drive motor 170 when the fuel cell vehicle 20 is driven at the set maximum speed may be specified as the first upper limit output. In another example, the first upper limit output may be set as the maximum output of the drive motor 170, irrespective of the driving speed of the fuel cell vehicle 20. In the first driving state, when a required output for the drive motor 170 is higher than the first upper limit output, the motor output actually output from the drive motor 170 is lower than the required output.

The "evacuation-time motor power consumption" (a) used at step S210 of FIG. 4 as described above may be an electric power determined in advance as a maximum power consumable by the drive motor 170 in the first driving state. For example, when speed limitation is imposed during the evacuation run, the "evacuation-time motor power consumption" (a) is a maximum power consumed by the drive motor 170 when the fuel cell vehicle 20 is driven in the first driving state at a set maximum speed. The "evacuation-time auxiliary machinery power consumption" (b) denotes the electric power consumed by the auxiliary machines of the fuel cell 100 when the fuel cell 100 generates electric power equivalent to the "evacuation-time motor power consumption" (a) as described above. The auxiliary machines of the fuel cell 100 include, for example, the circulation pump 127, the compressor 130 and a cooling medium pump configured to circulate the cooling medium in the fuel cell 100.

At a low-temperature start of the fuel cell vehicle 20, the warm-up operation is performed at the warm-up-time operation point determined to satisfy the predetermined target amount of generated electricity and the target amount of generated heat (step S110 in FIG. 2) as described above. When the inside of the fuel cell 100 is frozen to provide any negative voltage cell (step S120: YES), the current limitation is imposed to limit the output current of the fuel cell 100 (step S130). According to the embodiment, the warm-up-time operation point set at step S110 prior to the current limitation of step S130 is set such that the electric power generated by the fuel cell 100 is equal to or greater than the sum of the "evacuation-time motor power consumption" (a) and the "evacuation-time auxiliary machinery power consumption" (b). Accordingly, it is determined that the fuel cell 100 is in the low output condition at step S210 in FIG. 4, when any negative voltage cell is detected (step S120: YES in FIG. 2) during the warm-up operation and the current limitation is imposed to limit the output current of the fuel cell 100 (step S130).

Referring back to FIG. 4, when it is determined that the fuel cell 100 is in the low output condition (step S210: YES), the low output determiner 220 of the controller 200 subsequently determines whether a time elapsed since the first determination that the fuel cell 100 is in the low output condition at step S210 becomes equal to or longer than a predetermined reference time period (step S220). When the elapsed time has not yet reached the reference time period (step S220: NO), the controller 200 returns to step S200 and repeats the determination of whether the fuel cell 100 is in the low output condition.

When the fuel cell 100 is kept in the low output condition for the reference time period or longer (step S220: YES), the drive controller 230 of the controller 200 stops the fuel cell system 30 (step S230), sets the driving state of the fuel cell vehicle 20 to the first driving state using only the output power from the secondary battery 172 (step S240) and then terminates the routine. According to the embodiment, when the fuel cell 100 is kept in the low output condition for the reference time period or longer, this suggests unsuccessful progress of the warm-up operation and difficulty in eliminating the frozen state of the fuel cell 100. Accordingly, the fuel cell vehicle 20 positively gives up continuation of power generation by the fuel cell 100 prior to a forcible stop of power generation of the fuel cell 100 caused by the frozen state of the fuel cell 100 and is set in the first driving state. When the driving state of the fuel cell vehicle 20 is set to the first driving state, a display may be provided on a display unit or the like provided in an instrument panel of the fuel cell vehicle 20 to inform of unsuccessful progress of the warm-up operation and a resulting stop of power generation of the fuel cell 100 to reduce the output of the fuel cell vehicle 20. An additionally display may also be provided on the display unit or the like to demand an evacuation run for evacuating the fuel cell vehicle 20 to a safe location.

Freezing of the inside of the fuel cell 100 is likely to cause difficulty in normal progress of the power generation reaction and accompanied heat generation in a frozen location. Accordingly, unless the frozen state is immediately eliminated, this further makes it difficult to eliminate the frozen state with elapse of time. The reference time period used at step S220 is determined in advance as a time elapsed since the occurrence of the frozen state and as a time period that has is more likely to eliminate the frozen state. For example, this reference time period may be determined experimentally. A concrete procedure may start the fuel cell 100 in a low temperature condition, detect a time elapsed from detection of a negative voltage cell due to generation of a negative voltage to cancellation of the negative voltage and set a time period that is expected to eliminate the frozen state.

When it is determined that the fuel cell 100 is not in the low output condition (step S210: NO), the controller 200 subsequently determines whether the temperature of the fuel cell 10 is below the freezing point (step S250). The case where it is determined at step S210 that the fuel cell 100 is not in the low output condition includes the case where the fuel cell 100 is once determined to be in the low output condition at step S210 and gets out of the low output condition prior to elapse of the reference time period at step S220. More specifically, the fuel cell 100 is determined to get out of the low output condition, when it is determined at step S140 that the negative voltage cell is eliminated and the current limitation is removed at step S150 in FIG. 2 prior to elapse of the reference time period.

At step S250, the controller 200 determines whether the fuel cell 100 is heated and gets out of the state having a likelihood of freezing. For example, at step S250, like the processing of step S200, the controller 200 may obtain the temperature of the fuel cell 100 from the temperature sensor 105 and determine whether the temperature of the fuel cell 100 is below the freezing point. In another example, the reference temperature used at step S250 may be a temperature higher than the freezing point, since a location below the freezing point is likely to be present inside of the fuel cell 100 even when the temperature detected by the temperature sensor 105 is higher than the freezing point.

Another method different from the method using the detected temperature of the fuel cell 100 may be employed at step S250 to determine whether the fuel cell 100 gets out of the state having a likelihood of freezing. For example, when the amount of integration value of the output current of the fuel cell 100 since a start of the warm-up operation becomes larger than a predetermined reference value, it may be determined that the temperature of the fuel cell 100 becomes higher than the freezing point. The amount of integration value of the output current of the fuel cell 100 may be calculated by integrating the output current of the fuel cell 100 after a start of the warm-up operation with respect to time. The higher output current provides the larger amount of heat generated by the fuel cell 100. In the case where the amount of integration value of the output current of the fuel cell 100 becomes larger than the reference value in a predetermined time period, it is determined that a sufficient amount of heat is generated in the fuel cell 100 and that the fuel cell 100 accordingly gets out of the state having a likelihood of freezing.

When it is determined that the temperature of the fuel cell 100 is below the freezing point (step S250: YES), the controller 200 returns the flow to step S210 to determine whether the fuel cell 100 is in the low output condition. When it is determined that the temperature of the fuel cell 100 is higher than the freezing point (step S250: NO), on the other hand, the controller 200 terminates this routine.

As described above, at a low temperature start of the fuel cell vehicle 20, the fuel cell vehicle 20 of the embodiment having the above configuration sets the driving state to the first driving state that uses only the secondary battery 172 as the power source and that limits the motor output of the drive motor 170 to be equal to or lower than the predetermined first upper limit output, when the output condition of the fuel cell 100 continues to be the low output condition for the reference time period or longer. Even in the case of continuation of the state having the insufficient output of the fuel cell 100 at a low temperature start, this configuration reduces the possibility of causing the secondary battery 172 to be over-discharged to require an abrupt stop of the fuel cell vehicle 20. In the case where the output condition of the fuel cell 100 continues to be the low output condition for the reference time period or longer, this suggests the unsuccessful progress of the warm-up operation of the fuel cell 100. In this case, it is likely that the fuel cell 100 has an insufficient output, that the required power for the drive motor 170 is mainly supplied from the secondary battery 172 and that the state of charge of the secondary battery 172 is gradually decreased. Giving up continuation of power generation by the fuel cell 100 prior to a stop of power generation of the fuel cell 100 due to freezing enables the driving state of the fuel cell vehicle 20 to be set to the first driving state at a stage that the state of charge of the secondary battery 172 is still a relatively high level. As a result, even in the case of unsuccessful progress of the warm-up operation of the fuel cell 100 at a low temperature start of the fuel cell vehicle 20, this configuration allows for an evacuation run of the fuel cell vehicle 20 with suppressing over-discharge of the secondary battery 172 and thereby enhances the safety of the fuel cell vehicle 20.

Figure 5:
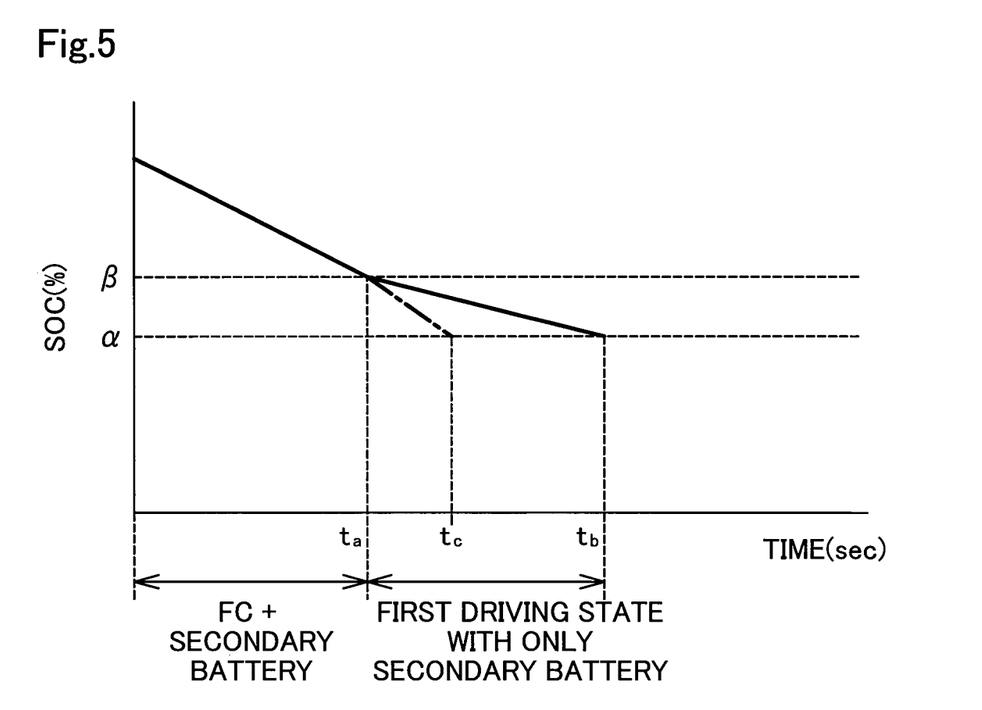
FIG. 5 is a diagram conceptually illustrating before and after a start of a first driving state.

FIG. 5 is a diagram conceptually illustrating before and after a start of the first driving state in the case where the output condition of the fuel cell 100 continues to be the low output condition for the reference time period or longer at a low temperature start. FIG. 5 shows an elapse of time as abscissa and a change in state of charge (SOC) of the secondary battery 172. A solid line graph in FIG. 5 indicates a start of the first driving state when the output condition of the fuel cell 100 continues to be the low output condition for the reference time period or longer.

At a start of the fuel cell vehicle 20 is a low temperature condition, the warm-up operation of the fuel cell 100 enables a certain amount of electricity to be generated by the fuel cell 100. The fuel cell vehicle 20 can thus be driven according to the required output for the drive motor 170 by using both the fuel cell 100 and the secondary battery 172. The fuel cell vehicle 20 keeps such driving until a time $t_a$ in the example of FIG. 5.

In the example of FIG. 5, at the time $t_a$, the controller 200 determines that the output condition of the fuel cell 100 continues to be the low output condition for the reference time period or longer (step S220: YES), stops the fuel cell system (step S230) and sets the driving state of the fuel cell vehicle 20 to the first driving state (step S240). Such control starts the first driving state at the stage that the state of charge of the secondary battery 172 is still a relatively high level and enables the fuel cell vehicle 20 to continue driving in the first driving state until the state of charge of the secondary battery 172 is decreased to a value $\alpha$ at a time $t_b$. The value $\alpha$ indicates a state of charge of the secondary battery 172 that is depleted to make the fuel cell vehicle 20 undrivable. In the example of FIG. 5, the state of charge of the secondary battery 172 is a value $\beta$ when the first driving state is started at step S240 in FIG. 4.

A one dot-chain line graph in FIG. 5 indicates a change in state of charge of the secondary battery 172 in the case where the control of the embodiment to set the first driving state is not performed but the fuel cell vehicle 20 is driven with both the secondary battery 172 and the fuel cell 100 as the power sources even after the time $t_a$. When the fuel cell vehicle 20 is driven continuously according to the required output by using both the fuel cell 100 and the secondary battery 172 as the power sources without limitation of the motor output of the drive motor 170 like the first driving state, the state of charge of the secondary battery 172 is expected to be decreased more rapidly than that in the first driving state. Continuation of driving in this state without a demanding an evacuation run, the state of charge of the secondary battery 172 is decreased to the value $\alpha$ at a time $t_c$ earlier than the time $t_b$. This is likely to require an abrupt stop of the fuel cell vehicle 20. According to the embodiment, when the fuel cell 10 is kept in the low output condition for the reference time period or longer, the fuel cell vehicle 20 is set to the first driving state and is demanded to perform an evacuation run at the stage that the state of charge of the secondary battery 172 is still a relatively high level. This enhances the safety of the fuel cell vehicle 20.

B. Second Embodiment

According to the first embodiment, when the output condition of the fuel cell 100 at a low temperature start of the fuel cell vehicle 20 does not correspond to the low output condition described above (step S210: NO), the processing of step S210 is repeated to determine whether the fuel cell 100 is in the low output condition until it is determined at step S250 that the fuel cell 100 gets out of the low temperature condition having a likelihood of freezing. In this state, the fuel cell vehicle 20 is driven according to the required output for the drive motor 170 by using both the fuel cell 100 and the secondary battery 172 as the power sources. Even in the case where the output condition of the fuel cell 100 does not correspond to the low output condition, the amount of electricity generated by the fuel cell 100 during the warm-up operation is kept lower than the amount of electricity generated in the steady state. Accordingly, when the fuel cell vehicle 20 is driven in this state for a long time period with repetition of the processing of step S210, the state of charge of the secondary battery 172 is likely to be decreased to an undesirable level. The following describes a configuration of a second embodiment that sets the driving state of the fuel cell vehicle 20 to a second driving state, based on the state of charge of the secondary battery 172 when the output condition of the fuel cell 100 at a low temperature start of the fuel cell vehicle 20 does not correspond to the low output condition described above (step S210: NO). The second driving state denotes a driving state that the motor output of the drive motor 170 is limited to be equal to or lower than a predetermined second upper limit output and that at least the fuel cell 100 is used as the power source unlike the first driving state.

Figure 6:
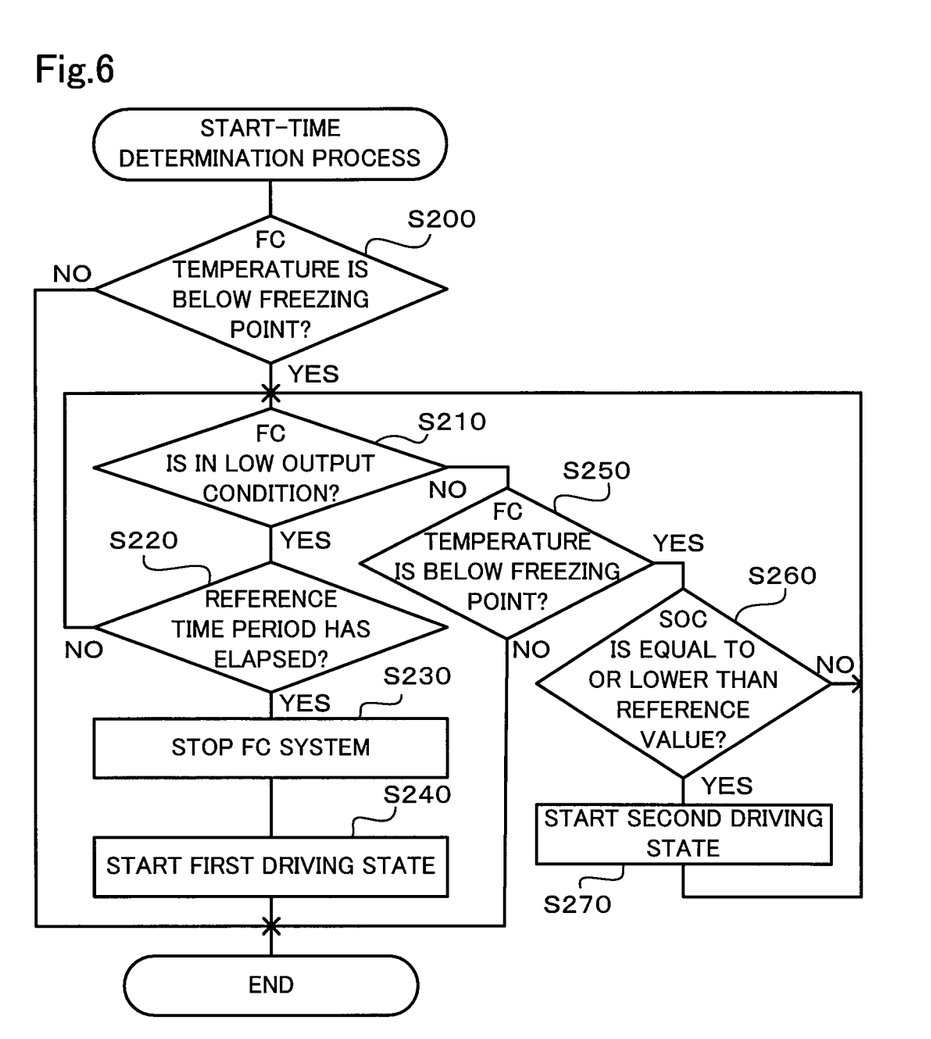
FIG. 6 is a flowchart showing another start-up determination process routine.

FIG. 6 is a flowchart showing a start-time determination process routine performed by the controller 200 of the fuel cell vehicle 20 at a start of the fuel cell vehicle 20 according to the second embodiment. The fuel cell vehicle 20 of the second embodiment has a similar configuration to that of the fuel cell vehicle 20 of the first embodiment shown in FIG. 1. The like components are expressed by the like reference signs and are not described in detail. The fuel cell vehicle 20 of the second embodiment performs the start-time determination process routine shown in FIG. 6, in place of the start-time determination process routine of the first embodiment shown in FIG. 4. Like steps in FIG. 6 to those in FIG. 4 are expressed by the like step numbers and are not described in detail.

When this routine is triggered by an operation of the start switch to input a start command, the CPU of the controller 200 determines whether the temperature of the fuel cell 100 is below the freezing point (step S200). When the temperature of the fuel cell 100 is below the freezing point (step S200: YES), the controller 200 subsequently determines whether the fuel cell 100 is in the low output condition described above (step S210). When the output condition of the fuel cell 100 does not correspond to the low output condition (step S210: NO), the controller 200 subsequently determines whether the temperature of the fuel cell 100 is below the freezing point (step S250). When the temperature of the fuel cell 100 is below the freezing point (step S250: YES), the controller 200 obtains the state of charge of the secondary battery 172 from the state of charge monitor 173 and determines whether the state of charge is equal to or lower than a predetermined reference value (step S260). When the state of charge of the secondary battery 172 is equal to or lower than the reference value (step S260: YES), the drive controller 230 of the controller 200 sets the driving state of the fuel cell vehicle 20 to the second driving state (step S270). The controller 200 then returns the flow to step S210. The second driving state is maintained while the output condition of the fuel cell 100 does not correspond to the low output condition (step S210: NO), the temperature of the fuel cell 100 is below the freezing point (step S250: YES), and the state of charge of the secondary battery 172 is kept to be equal to or lower than the reference value (step S260: YES). When the state of charge of the secondary battery 172 is higher than the reference value (step S260: NO), on the other hand, the controller 200 returns the flow to step S210 without setting the driving state of the fuel cell vehicle 20 to the second driving state.

Figure 7:
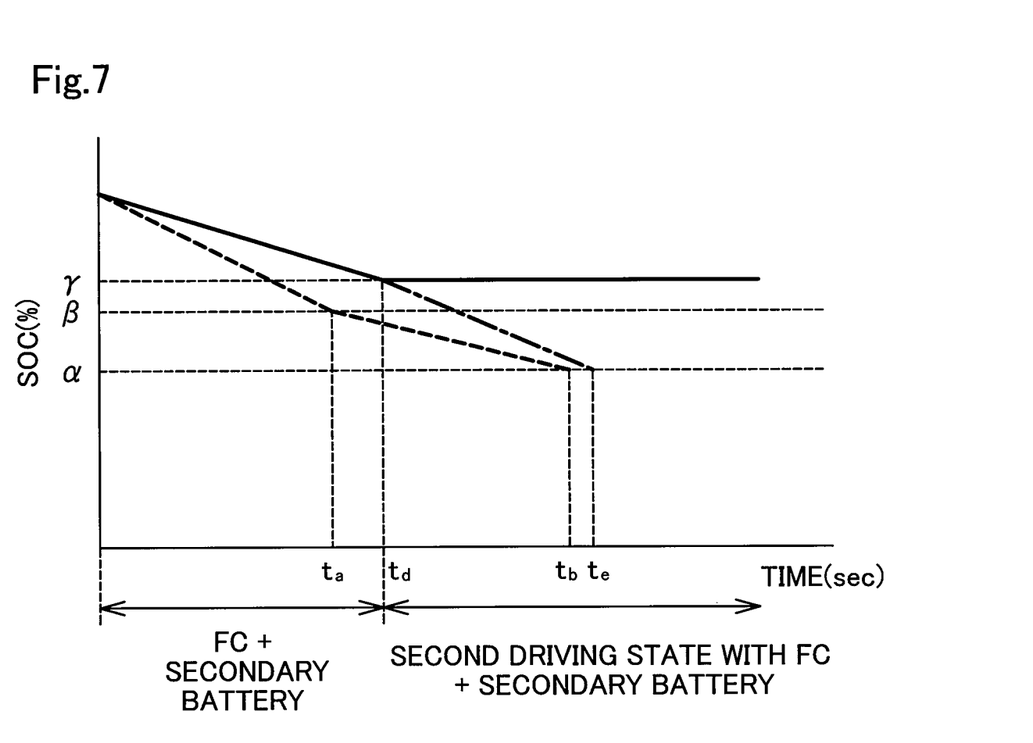
FIG. 7 is a diagram conceptually illustrating before and after a start of a second driving state.

FIG. 7 is a diagram conceptually illustrating before and after a start of the second driving state in the case where the output condition of the fuel cell 100 does not correspond to the low output condition described above at a low temperature start of the fuel cell vehicle 20. FIG. 7 shows an elapse of time as abscissa and a change in state of charge (SOC) of the secondary battery 172. A solid line graph in FIG. 7 indicates a start of the second driving state when the output condition of the fuel cell 100 does not correspond to the low output condition described above and the state of charge of the secondary battery 172 is equal to or lower than the reference value. A dotted line graph in FIG. 7 indicates a start of the first driving state when the output condition of the fuel cell 100 continues to be the low output condition for the reference time period or longer at a low temperature start as shown in FIG. 5.

In the example of FIG. 7, at a time $t_d$, the controller 200 determines that the state of charge of the secondary battery 172 becomes equal to or lower than a value γ that is used as the reference value (step S260: YES) and starts the second driving state (step S270). The fuel cell vehicle 20 is driven according to the required output for the drive motor 170 by using both the fuel cell 100 and the secondary battery 172 as the power source until the time $t_d$. During this driving, the output condition of the fuel cell 100 does not correspond to the low output condition described above (step S210: NO). This state enables the drive motor 170 to use a larger amount of electricity generated by the fuel cell 100 and reduces the electric power taken from the secondary battery 172, compared with the state that the fuel cell 100 is in the low output condition. In the example of FIG. 7, the degree of reduction in the state of charge until the time $t_d$ in the solid line graph is more gentle than the state that the output condition of the fuel cell 100 is the low output condition shown by the dotted line graph.

According to this embodiment, the value γ shown in FIG. 7 is used as the reference value of the state of charge used at step S260 for the determination whether the driving state of the fuel cell vehicle 20 is to be set to the second driving state. In the second driving state, the motor output of the drive motor 170 is limited such that the maximum power consumed by the drive motor 170 is equal to or smaller than the "evacuation-time motor power consumption" (a) described above. More specifically, according to the second embodiment, the second upper limit output that is the maximum motor output in the second driving state is set to the motor output that causes the electric power consumed by the drive motor 170 to be equal to the "evacuation-time motor power consumption" (a). When the required output for the drive motor 170 is higher than the second upper limit output, the motor output of the drive motor 170 becomes lower than the required output. Accordingly, when the driving state of the fuel cell vehicle 20 is set to the second driving state at step S270, a display may be provided on the display unit or the like provided in the instrument panel of the fuel cell vehicle 20 to inform of a reduction of the state of charge of the secondary battery 172 and a resulting reduction of the vehicle output during the warm-up operation of the fuel cell 100.

Before the second driving state is started at step S270, it is determined at step S210 that the output condition of the fuel cell 100 does not correspond to the low output condition described above. When it is determined that the output condition of the fuel cell 100 does not correspond to the low output condition (step S210: NO), the output power of the fuel cell 100 is equal to or greater than the sum of the "evacuation-time motor power consumption" (a) and the "evacuation-time auxiliary machinery power consumption" (b) as described above. Accordingly, in the second driving state, electric power required to drive the drive motor 170 may be covered by the fuel cell 100. As shown in FIG. 7, this suppresses reduction in the state of charge of the secondary battery 172 after the time $t_d$. As one example, FIG. 7 shows the state that the output power of the fuel cell 100 in the second driving state becomes equal to the sum of the "evacuation-time motor power consumption" (a) and the "evacuation-time auxiliary machinery power consumption" (b) and that the state of charge of the secondary battery 172 is kept at the value γ.

A one dot-chain line graph in FIG. 7 indicates a change in state of charge of the secondary battery 172 in the case where the control of the embodiment to set the second driving state is not performed but the fuel cell vehicle 20 is driven with both the secondary battery 172 and the fuel cell 100 as the power sources even after the time to when the state of charge of the secondary battery 172 is reduced to the value γ. When the fuel cell vehicle 20 is driven continuously according to the required output by using both the fuel cell 100 and the secondary battery 172 as the power sources without limitation of the motor output of the drive motor 170 like the second driving state, the state of charge of the secondary battery 172 is expected to be decreased more rapidly than that in the second driving state. During continuation of driving of the fuel cell vehicle 20 without limitation of the motor output, when it takes time to raise the temperature of the fuel cell 100 to be higher than the freezing point, the state of charge of the secondary battery 172 is reduced to the value α at a time $t_e$. This is likely to require an abrupt stop of the fuel cell vehicle 20.

When the output power of the fuel cell 100 becomes greater than the electric power consumed by the drive motor 170 in the second driving state, this enables the secondary battery 172 to be charged by the fuel cell 100. When the state of charge of the secondary battery 172 is recovered by such charging, the controller 200 determines that the state of charge of the secondary battery 172 is higher than the reference value (step S260: NO) and cancels the second driving state in a subsequent cycle of the routine after setting of the driving state of the fuel cell vehicle 20 to the second driving state. In the second driving state, when the inside of the fuel cell 100 is frozen (step S120: YES in FIG. 2) and the limitation of the output current is imposed (step S130 in FIG. 2), the output condition of the fuel cell 100 reaches the low output condition (step S210: YES). When the fuel cell 100 continues to be in the low output condition for the reference time period or longer (step S220: YES), the controller 200 stops the fuel cell system 30 (step S230) and sets the first driving state that uses only the secondary battery 172 as the power source (step S240). When it is determined that the temperature of the fuel cell 100 becomes higher than the freezing point (step S250: NO) in the second driving state, this enables the higher output to be obtained from the fuel cell 100. The controller 200 accordingly cancels the second driving state and terminates the routine.

The configuration of the second embodiment advantageously suppresses the state of charge of the secondary battery 172 from being reduced to an undesirable level during the warm-up operation of the fuel cell 100 at a low temperature start of the fuel cell vehicle 20, in addition to the advantageous effects similar to those of the first embodiment. More specifically, when the state of charge of the secondary battery 172 is reduced to the value γ, the second driving state is started with limitation of the motor output of the drive motor 170 to be equal to or lower than the second upper limit output. This suppresses reduction in the state of charge of the secondary battery 172. Setting the second driving state enables the fuel cell vehicle 20 to be driven with continuation of the warm-up operation of the fuel cell 100, while suppressing reduction in the state of charge of the secondary battery 172. According to the second embodiment, the second upper limit output that is the maximum motor output in the second driving state is set to the motor output that causes the electric power consumed by the drive motor 170 to be equal to the "evacuation-time motor power consumption" (a). According to a modification, a different value may be set as the second upper limit output.

C. Third Embodiment

According to the first embodiment and the second embodiment, the output power of the fuel cell 100 is used as the operation condition of the fuel cell 100 detected by the detector 210, and it is determined at step S210 whether the fuel cell 100 is in the low output condition, based on the determination of whether the output power is equal to or greater than the sum of the "evacuation-time motor power consumption" (a) and the "evacuation-time auxiliary machinery power consumption" (b). A different configuration may, however, be employed as a third embodiment. For example, the output power of the fuel cell 100 is used as the operation condition of the fuel cell 100, and it may be determined that the fuel cell 100 is in the low output condition when the actual output power of the fuel cell 100 is smaller than the output power of the fuel cell 100 at the warm-up-time operation point set at step S110. This configuration of the third embodiment provides similar advantageous effects to those of the first embodiment or the second embodiment.

D. Fourth Embodiment

According to the first embodiment, it is determined at step S210 whether the fuel cell 100 is in the low output condition by using the output power of the fuel cell 100 as the operation condition of the fuel cell 100. A different configuration may, however, be employed. The following describes a configuration of a fourth embodiment that uses a temperature rise rate of the fuel cell 100 as the operation condition of the fuel cell 100.

The fuel cell vehicle 20 of the fourth embodiment has a similar configuration of the fuel cell vehicle 20 of the first embodiment and is thus not described in detail. The fuel cell vehicle 20 of the fourth embodiment performs a similar control to that of the fuel cell vehicle 20 of the first embodiment at a low temperature start of the fuel cell vehicle 20 except the details of the determination at step S210.

According to the fourth embodiment, at step S210, the detector 210 of the controller 200 obtains detection signals of the temperature sensor 105 at predetermined time intervals and calculates a temperature rise rate of the fuel cell 100. When the calculated temperature rise rate is lower than a predetermined reference temperature rise rate, the controller 200 determines that the output condition of the fuel cell 100 is the low output condition. The reference temperature rise rate may be determined in advance as a temperature rise rate of the fuel cell 100 when the warm-up operation is performed in the state that the inside of the fuel cell 100 is not frozen. More specifically, the reference temperature rise rate may be a temperature rise rate of the fuel cell 100 when no negative voltage cell is detected during the warm-up operation (step S120: NO in FIG. 2) and power generation of the fuel cell 100 is performed at the warm-up-time operation point set at step S110 without the current limitation of step S130.

The amount of heat generated by the fuel cell 100 may be calculated from the output current of the fuel cell 100. The heat capacity of the fuel cell 100 may be determined, based on the sizes and the materials of respective components of the fuel cell 100. Accordingly, the reference temperature rise rate may be a temperature rise rate of the fuel cell 100 when power generation of the fuel cell 100 is performed at the warm-up-time operation point by further taking into account the amount of heat radiation under the start-time low temperature condition. For example, at every start time of the fuel cell vehicle 20, the amount of heat radiation may be corrected based on the temperature at the start time to change the reference temperature rise rate. When the temperature rise rate of the fuel cell 100 does not reach the reference temperature rise rate, it may be determined that the inside of the fuel cell 100 is frozen to cause an insufficiency of hydrogen in any of the unit cells and that the fuel cell 100 is in the low output state with limitation of the output current.

Like the first embodiment, this configuration of the fourth embodiment reduces the possibility of causing the secondary battery 172 to be over-discharged and requiring an abrupt stop of the fuel cell vehicle 20, even in the case of continuation of the state of insufficient output of the fuel cell 100 at a low temperature start of the fuel cell vehicle 20.

E. Fifth Embodiment

The following describes a configuration of a fifth embodiment that uses information indicating whether any of the plurality of unit cells constituting the fuel cell 100 is a cell having an insufficiency of hydrogen that is to be supplied to the anode (hereinafter may be referred to as hydrogen depletion cell), as the operation condition of the fuel cell 100. The fuel cell vehicle 20 of the fifth embodiment has a similar configuration of the fuel cell vehicle 20 of the first embodiment and is thus not described in detail. The fuel cell vehicle 20 of the fifth embodiment performs a similar control to that of the fuel cell vehicle 20 of the first embodiment at a low temperature start of the fuel cell vehicle 20 except the details of the determination at step S210.

According to the fifth embodiment, at step S210, the detector 210 of the controller 200 obtains a detection signal from the cell monitor 106 and determines whether there is any hydrogen depletion cell. More specifically, it is determined that there is any hydrogen depletion cell, when any negative voltage cell is detected. When any negative voltage cell is present, it is determined that the output condition of the fuel cell 100 is the low output condition. When there is any negative voltage cell 8 step S120: YES), the current limitation is imposed in the fuel cell 100 (step S130). Accordingly, it is determined that the fuel cell 100 is in the low output condition with limitation of the output current of the fuel cell 100.

Like the first embodiment, this configuration of the fifth embodiment reduces the possibility of causing the secondary battery 172 to be over-discharged and requiring an abrupt stop of the fuel cell vehicle 20, even in the case of continuation of the state of insufficient output of the fuel cell 100 at a low temperature start of the fuel cell vehicle 20.

According to the fifth embodiment, the presence or the absence of a hydrogen depletion cell is determined, based on the determination of the presence or the absence of a negative voltage cell. A different configuration may, however, be employed. For example, when the current limitation is imposed in the fuel cell 100, it may be determined that there is any hydrogen depletion cell. Another procedure may measure an impedance of the fuel cell 100 by an AC impedance method and determine that there is any hydrogen depletion cell when the measured impedance is higher than a predetermined reference value. More specifically, the impedance of the fuel cell 100 is detected by the AC impedance method by superimposing an AC signal on the electric current that is to be taken out from the fuel cell 100. When the impedance of the fuel cell 100 under application of an AC signal of a low frequency (for example, 1 to 100 Hz) becomes higher than the predetermined reference value, it is determined that there is any unit cell having an insufficiency of hydrogen. In the case of superimposition of the AC signal of the low frequency as described above, the measured impedance includes a reactance that reflects a moving resistance of the gas, in addition to a resistance component. This configuration allows for the above determination.

The present disclosure is not limited to any of the embodiments described above but may be implemented by a diversity of other configurations without departing from the scope of the disclosure. For example, the technical features of any of the above embodiments corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein. For example, the present disclosure may be implemented as the following aspects.

(1) According to one aspect of the present disclosure, there is provided a fuel cell vehicle. This fuel cell vehicle comprises a fuel cell; a power storage device configured to be charged; a drive motor configured to receive electric power supplied from at least one of the fuel cell and the power storage device and to drive the fuel cell vehicle; a temperature sensor configured to measure a temperature of the fuel cell; a detector configured to detect an operation condition of the fuel cell; and a controller configured to control a driving state of the fuel cell vehicle. At a start time of the fuel cell, in a case where the temperature of the fuel cell detected by the temperature sensor is below a freezing point, when an output condition of the fuel cell shown by the detected operation condition of the fuel cell continuously corresponds to a predetermined low output condition for a predetermined reference time period or longer, the controller sets the driving state of the fuel cell vehicle to a first driving state that stops power generation of the fuel cell, drives the drive motor by using only the power storage device as a power source and limits a motor output of the drive motor to be equal to or lower than a predetermined first upper limit output.

At a low temperature start of the fuel cell vehicle, when the output condition of the fuel cell is continuously the low output condition for the reference time period or longer, the fuel cell vehicle of this aspect sets the driving state of the fuel cell vehicle to the first driving state that limits the motor output of the drive motor to be equal to or lower than the predetermined first upper limit output and uses only the power storage device, such as a secondary battery, as the power source. Even in the case of continuation of the state of insufficient output of the fuel cell at the low temperature start of the fuel cell vehicle, this configuration reduces the possibility of causing the power storage device to be over-discharged and requiring an abrupt stop of the fuel cell vehicle.

(2) In the fuel cell vehicle of the above aspect, the detector may detect an output power of the fuel cell, as the operation condition, and the low output condition may be a condition that the output power of the fuel cell detected by the detector is smaller than a sum of a first power determined in advance as a maximum electric power consumable by the drive motor in the first driving state and a second power consumed by an auxiliary machine of the fuel cell during generation of electric power equivalent to the first power by the fuel cell. The fuel cell vehicle of this aspect appropriately determines whether the output condition of the fuel cell is the low output condition, based on the output power of the fuel cell.

(3) In the fuel cell vehicle of the above aspect, the detector may use the temperature sensor to detect a temperature rise rate of the fuel cell, as the operation condition, and the low output condition may be a condition that the temperature rise rate detected by the detector is lower than a predetermined reference temperature rise rate that is a temperature rise rate of the fuel cell when warm-up operation is performed in a state that inside of the fuel cell is not frozen. The fuel cell vehicle of this aspect appropriately determines whether the output condition of the fuel cell is the low output condition, based on the temperature rise rate of the fuel cell.

(4) In the fuel cell vehicle of the above aspect, the detector may detect whether the fuel cell includes any hydrogen depletion cell having an insufficiency of hydrogen that is supplied to an anode of the fuel cell, as the operation condition, and the low output condition may be a condition that presence of any hydrogen depletion cell is detected by the detector. The fuel cell vehicle of this aspect appropriately determines whether the output condition of the fuel cell is the low output condition, based on the presence or the absence of a hydrogen depletion cell.

(5) The fuel cell vehicle of the above aspect may further comprise a state of charge monitor configured to detect a state of charge of the power storage device. At the start time of the fuel cell, in a case where the temperature of the fuel cell detected by the temperature sensor is below the freezing point and the output condition of the fuel cell does not correspond to the low output condition, the controller may determine whether the state of charge of the power storage device detected by the state of charge monitor is equal to or lower than a predetermined reference value. When the state of charge of the power storage device is equal to or lower than the reference value, the controller may set the driving state of the fuel cell vehicle to a second driving state that limits the motor output to be equal to or lower than a predetermined second upper limit output and uses at least the fuel cell as a power source. The fuel cell vehicle of this aspect suppresses the state of charge of the power storage device such as a secondary battery from being reduced to an undesirable level at the low temperature start of the fuel cell vehicle.

The present disclosure may be implemented by any of various aspects other than the aspects of the fuel cell vehicle described above, for example, a control method of the fuel cell vehicle, a computer program configured to implement the control method, and a non-transitory recording medium in which the computer program is recorded.

What is claimed is:
1. A fuel cell vehicle, comprising:
a fuel cell;
a power storage device configured to be charged;
a drive motor configured to receive electric power supplied from at least one of the fuel cell and the power storage device and to drive the fuel cell vehicle;
a temperature sensor configured to measure a temperature of the fuel cell;
a detector configured to detect an operation condition of the fuel cell; and
a controller configured to control a driving state of the fuel cell vehicle, wherein
at a start time of the fuel cell, in a case where the temperature of the fuel cell detected by the temperature sensor is below a freezing point,
when an output condition of the fuel cell shown by the detected operation condition of the fuel cell continuously corresponds to a predetermined low output condition for a predetermined reference time period or longer, the controller sets the driving state of the fuel cell vehicle to a first driving state that stops power generation of the fuel cell, drives the drive motor by using only the power storage device as a power source and limits a motor output of the drive motor to be equal to or lower than a predetermined first upper limit output.

2. The fuel cell vehicle according to claim 1,
wherein the detector detects an output power of the fuel cell, as the operation condition, and
the low output condition is a condition that the output power of the fuel cell detected by the detector is smaller than a sum of a first power determined in advance as a maximum electric power consumable by the drive motor in the first driving state and a second power consumed by an auxiliary machine of the fuel cell during generation of electric power equivalent to the first power by the fuel cell.

3. The fuel cell vehicle according to claim 1,
wherein the detector uses the temperature sensor to detect a temperature rise rate of the fuel cell, as the operation condition, and
the low output condition is a condition that the temperature rise rate detected by the detector is lower than a predetermined reference temperature rise rate that is a temperature rise rate of the fuel cell when warm-up operation is performed in a state that inside of the fuel cell is not frozen.

4. The fuel cell vehicle according to claim 1,
wherein the detector detects whether the fuel cell includes any hydrogen depletion cell having an insufficiency of hydrogen that is supplied to an anode of the fuel cell, as the operation condition, and
the low output condition is a condition that presence of any hydrogen depletion cell is detected by the detector.

5. The fuel cell vehicle according to claim 1, further comprising:
a state of charge monitor configured to detect a state of charge of the power storage device, wherein
at the start time of the fuel cell, in a case where the temperature of the fuel cell detected by the temperature sensor is below the freezing point and the output condition of the fuel cell does not correspond to the low output condition,
the controller determines whether the state of charge of the power storage device detected by the state of charge monitor is equal to or lower than a predetermined reference value, and
when the state of charge of the power storage device is equal to or lower than the reference value, the controller sets the driving state of the fuel cell vehicle to a second driving state that limits the motor output to be equal to or lower than a predetermined second upper limit output and uses at least the fuel cell as a power source.

6. A control method of a fuel cell vehicle equipped with a fuel cell and a power storage device as driving power sources, the control method comprising:

at a start time of the fuel cell, in a case where temperature of the fuel cell is below a freezing point, detecting an operation condition of the fuel cell, and when an output condition of the fuel cell shown by the detected operation condition of the fuel cell continuously corresponds to a predetermined low output condition for a predetermined reference time period or longer, setting a driving state of the fuel cell vehicle to a first driving state that stops power generation of the fuel cell, drives a drive motor provided to drive the fuel cell vehicle by using only the power storage device as a power source and limits a motor output of the drive motor to be equal to or lower than a predetermined first upper limit output.

\* \* \* \* \*